United States Patent [19]

Miller

[11] 4,414,625
[45] Nov. 8, 1983

[54] SYSTEM CONDITION SELECTION CIRCUITRY

[75] Inventor: Christopher F. Miller, Diamond Bar, Calif.

[73] Assignee: Burroughs Corporation, Detroit, Mich.

[21] Appl. No.: 114,971

[22] Filed: Jan. 24, 1980

[51] Int. Cl.³ ............................ G06F 9/00; G06F 9/22
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,794,979 | 2/1974 | McMahon | 364/200 |
| 4,001,788 | 1/1977 | Patterron et al. | 364/200 |
| 4,038,643 | 7/1977 | Kim | 364/200 |

*Primary Examiner*—Gareth D. Shaw
*Assistant Examiner*—John G. Mills

*Attorney, Agent, or Firm*—Nathan Cass; Kevin R. Peterson; David G. Rasmussen

[57] ABSTRACT

An apparatus in a microprogrammed digital data processing system is disclosed for reducing the time to select, from a plurality of available system condition signals in the system, one system condition signal to be tested during the performance of a microinstruction. The operation code portion of a new macroinstruction word is used to address a memory to output an associated one of a plurality of stored preselected signal patterns. In response to the outputted signal pattern, a first selection circuit preselects a set of system condition signals from the plurality of available system condition signals. A second selection circuit is responsive to a control signal provided by each microinstruction of the instruction for selecting a particular one of the set of system condition signals to be tested.

7 Claims, 2 Drawing Figures

SYSTEM CONDITION SELECTION CIRCUITRY

BACKGROUND OF THE INVENTION

This invention relates to an improved apparatus for reducing the propagation delay time in the system condition selection circuitry of a microprogrammed digital data processing system.

SUMMARY OF THE INVENTION

Briefly, an improved apparatus is provided for reducing the propagation delay time involved in the selection, from a plurality of available operational conditions provided in a microprogrammed digital data processing system, of a desired operational condition to be tested during performance of a microinstruction.

It is therefore an object of this invention to provide an improved selection network for selecting conditions to be tested during microinstruction execution.

Another object of this invention is to provide an apparatus which selects and tests a desired system condition signal within the same clock period used for execution of a microinstruction.

A further object of this invention is to provide an apparatus which, as a function of the operation code portion of a new macroinstruction, performs a preselection of a relatively small number of available operational conditions from which an internally stored microinstruction selects a particular desired operational condition in order to determine microinstruction sequencing.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein.

DESCRIPTION OF THE PREFERRED EMBODIMENT

Figure 1:
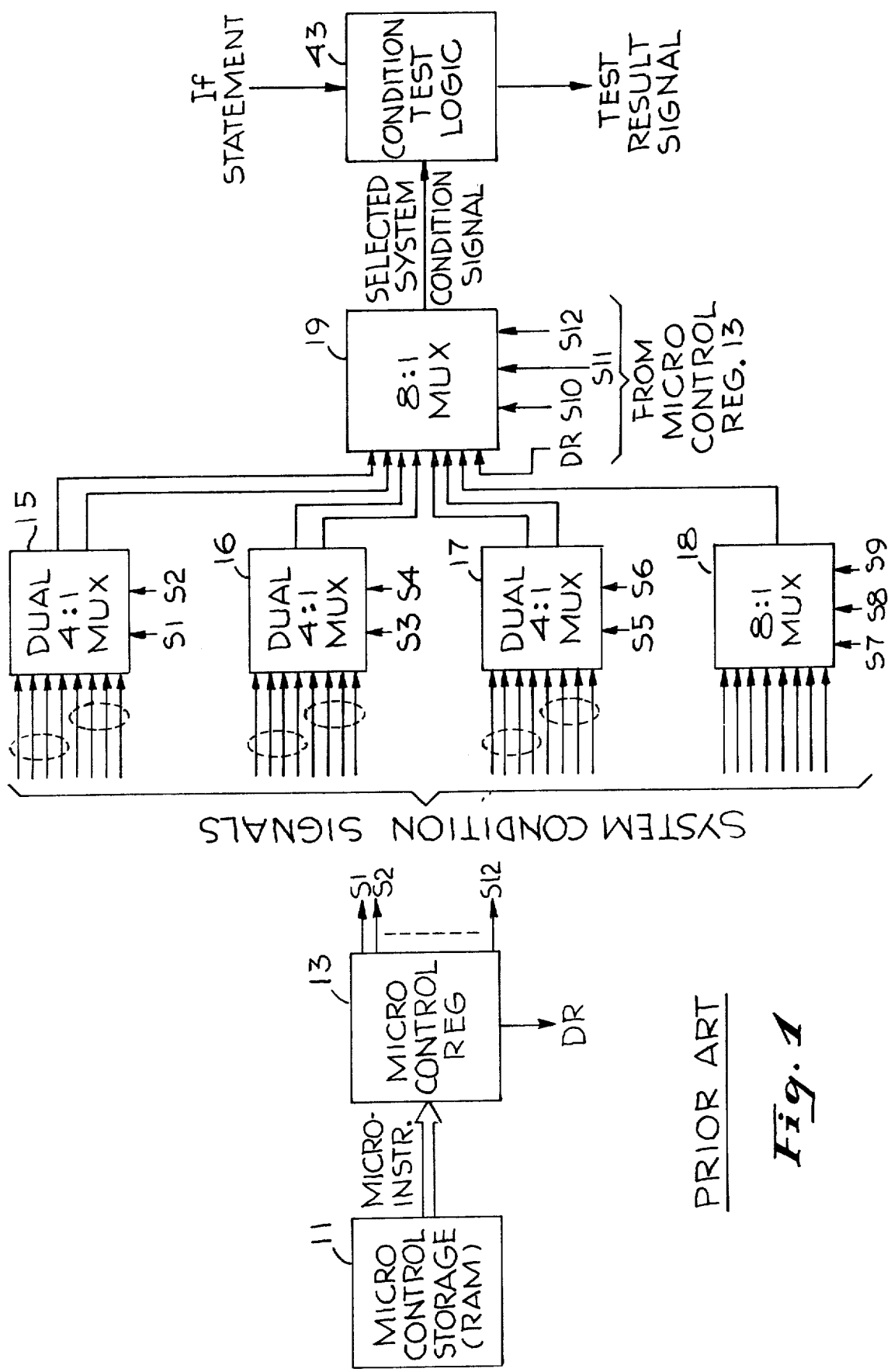
FIG. 1 illustrates a schematic block diagram of a prior art apparatus for selecting a desired operational condition.

Referring now to the drawings, FIG. 1 discloses a prior art apparatus for selecting a desired operational condition to be tested during execution of a microinstruction for use in determining microinstruction sequencing. As shown, a 12-bit long portion of a microinstruction from a micro control storage or RAM (random access memory) 11 is stored in a micro control register 13. As is well known in the art, a portion of this microinstruction is used in controlling data processing operations in the system. In this illustrated example the 12-bit portion of the microinstruction, designated as S1 through S12, is used to select for testing one of 32 operational conditions in the system.

The 32 system conditions available for testing are divided into four groups of eight system condition signals each. These four groups are respectively applied to multiplexor (MUX) chips 15 through 18. Each of the multiplexor chips 15–17 is comprised of dual 4:1 multiplexors or two multiplexors, with each one of the dual 4:1 multiplexors receiving half of the associated input eight system condition signals. The multiplexor chip 18 is comprised of an 8:1 multiplexor.

In operation, the bits S1–S9 are selectively applied to the multiplexor chips 15–18 to enable the chips 15–18 to select and apply seven of the input system condition signals to an 8:1 multiplexor 19. More specifically, the S1 and S2 bits are both used as the binary address for each of the multiplexors on the chip 15. In this manner, the chip 15 selects and applies two of its input system condition signals to the multiplexor 19. The multiplexor chips 16 and 17 operate in a manner similar to that of the chip 15, with the S3 and S4 bits being applied to the chip 16 and the S5 and S6 bits being applied to the chip 17. In response to the bits S7, S8 and S9 of the microinstruction, the multiplexor 18 selects only one of the input eight system condition signals for application to the multiplexor 19.

A direct signal DR, which may be a fixed signal, is applied from the micro control register 13 as the eighth input signal to the multiplexor 19. It should be noted at this point that the multiplexor 18 could be replaced with a dual 4:1 multiplexor chip, like the chips 15–18, with the second output from that dual 4:1 multiplexor chip replacing the signal DR.

In responsse to the bits S10, S11 and S12 from the micro control register 13, the multiplexor 19 selects one of the input seven system condition signals from the multiplexor chips 15–18. This selected condition signal is applied to a condition test logic circuit 43 to enable the circuit 21 to answer an input "if statement" with a "test result".

In the prior art test selection network of FIG. 1, it should be noted that there is a propagation delay from the time the micro control register 13 is set up through two levels of multiplexors (15–18 for one level and 19 for the other level) before the test condition is applied to the test logic circuit 43. Where there is only a limited time for the selection and testing of a condition signal, such a propagation delay may be unacceptable for proper system operation.

Figure 2:
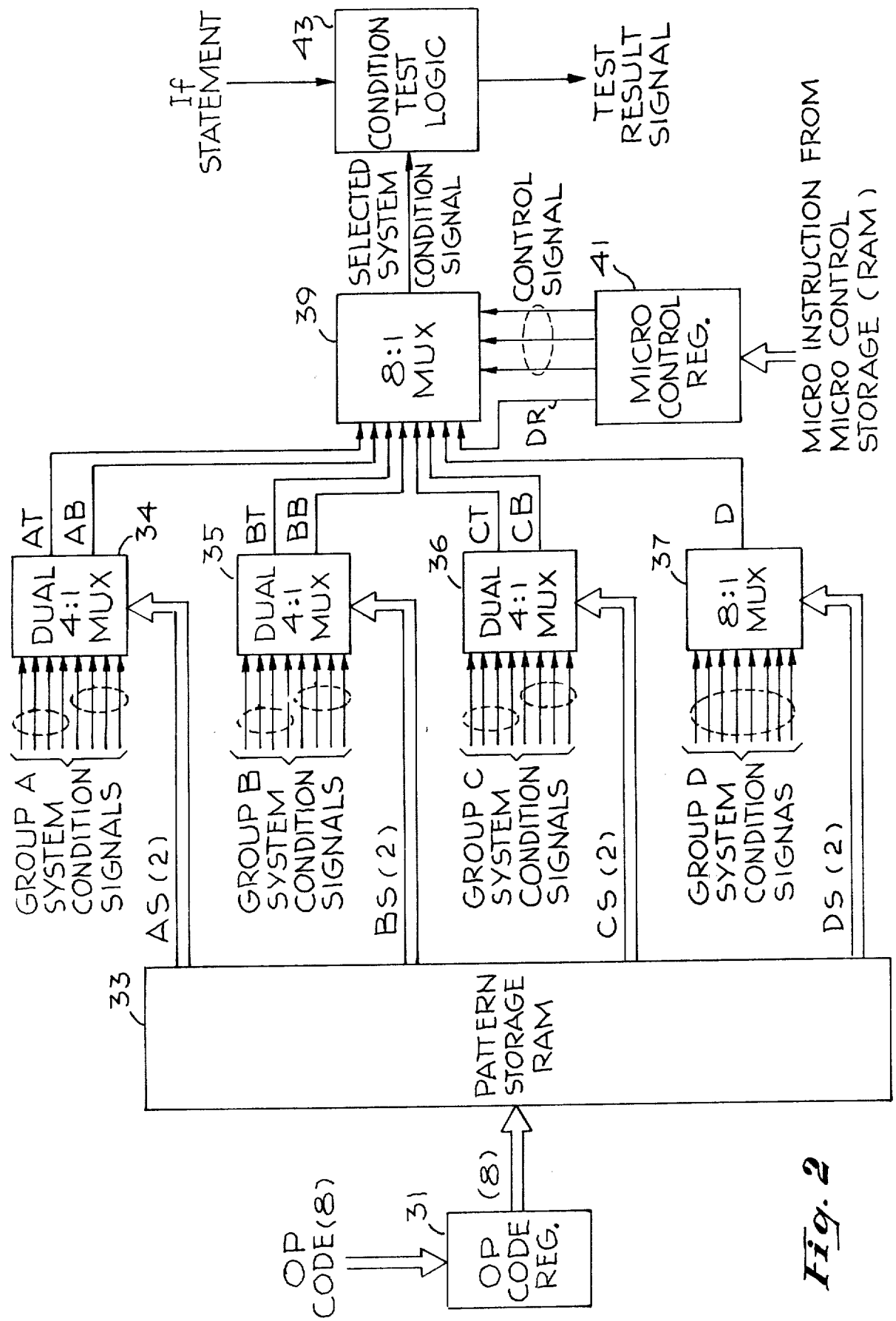
FIG. 2 illustrates a schematic block diagram of a preferred embodiment of the invention.

FIG. 2 illustrates a schematic block diagram of a preferred embodiment of the invention. Such a system condition selection network minimizes the propagation delay inherent in the prior art apparatus of FIG. 1.

In FIG. 2 an 8-bit operation (OP) code portion of a new macroinstruction is loaded into an OP code register 31. This OP code can be supplied directly from the system memory (not shown), from fetch (not shown) or from any other suitable source in the system. The OP code in the register 31 is used as the address to enable a pattern storage circuit 33, which could be, for example, a RAM, ROM or a PROM, but for flexibility is preferably a random access memory (RAM), to read out an associated prestored pattern of select signals, designated as AS, BS, CS and DS. Each of the AS, BS and CS signals is a two-bit signal, while the DS signal is a three-bit signal.

The patterns stored in the RAM 33 are derived as functions of the various OP codes used in the system. Initially, an analysis of the entire OP code program used in the system revealed that, on the basis of the propagation time involved in test condition selection, not more than 7 of the possible 32 conditions to be tested would be required for any of the OP codes used in the program. As a result, each of the patterns stored in the RAM 33 was preselected as a function of a particular OP code of a new macroinstruction to control the selection of a particular seven of the 32 test conditions which might be required for testing for each macroinstruction of this macroinstruction.

The 32 possible test conditions in the system are divided into equally numbered groups A, B, C and D for application to multiplexor chips 34–37, respectively. The structure and operation of the chips 34–37 are similar to those of the chips 15–18 of FIG. 1.

Select signals AS, BS CS andDS are respectively applied to the multiplexor chips 34–37 to enable them to select and apply seven of the 32 system condition signals on output signal lines AT, AB, BT, BB, CT, CB and D, respectively, as a function of the signal pattern from the RAM 33. Basically, the select signals AS, BS, CS and DS tell the multiplexor chips 34–37, respectively, which relative positions of the input system condition signals to place on the output signal lines.

As shown in FIG. 2, the pair of output signals lines from the dual multiplexor 34 are designated as AT and AB. Likewise, the pairs of output signal lines from the dual multiplexors 35 and 36 are respectively designated as BT, BB and CT, CB. Finally, the output signal line from the multiplexor 37 is designated as D.

The selected seven system condition signals are applied as inputs to an 8:1 multiplexor 39. A direct input signal DR, which may be a fixed signal, is applied from micro control register 41 as the eighth input signal to the multiplexor 39.

As noted before in relation to the multiplexor 18, the 8:1 multiplexor 37 could be replaced with a dual 4:1 multiplexor chip, with the second output from that dual 4:1 multiplexor chip replacing the signal DR.

During the performance of a macroinstruction in the digital data processing system, the micro control register 41 sequentially receives one or more microinstructions from a micro control storage circuit (FIG. 1) in a manner well known in the art. For example, a microinstruction can be provided in a manner similar to that illustrated and described in U.S. Pat. No. 4,038,643.

Binary states of a three-bit control signal, which is part of the microinstruction stored in the micro control register 41, are used to address the multiplexor 39 to enable the multiplexor 39 to select one of the preselected seven system condition signals (which it will be remembered is selected to response to the OP code of the macroinstruction) applied from the multiplexor chips 34–37. It should be noted at this time that, for any microinstruction wherein no system condition signal is needed or desired to be selected and tested, the binary states of the control signal are such that the direct input signal DR is selected by the multiplexor 39.

The system condition signal selected by the multiplexor 39 is utilized by a condition test logic circuit 43 to develop a test result in response to an input "if statement" from another part of the system. Essentially, the logic circuit 43 determines whether the "if statement" is true or false, based on the binary state of the selected system condition signal.

The following simplified TABLE illustrates various preselected system condition signals that can be selectively outputted by the multiplexor chips 34–37 in response to corresponding prestored signal patterns developed by the pattern storage RAM 33 as a function of associated OP codes.

TABLE

| OP Codes | Preselected Test Conditions to MUX 39 | | | | | | | OP Codes | Preselected Test Conditions to MUX 39 | | | | | | |
|---|---|---|---|---|---|---|---|---|---|---|---|---|---|---|---|
| | AT | AB | BT | BB | CT | CB | D | | AT | AB | BT | BB | CT | CB | D |
| 01 | 2 | 2 | | | 1 | 1 | | 28 | 2 | 2 | | | | | 4 |
| 02 | 2 | 2 | 0 | 0 | 1 | 1 | 2 | 29 | 2 | 2 | | | | | 4 |
| 03 | 2 | 2 | | | 1 | 1 | | 30 | 2 | 2 | | | | | 4 |
| 04 | 2 | 2 | 0 | 0 | 1 | 1 | 2 | 31 | 2 | 2 | | | | | 4 |
| 05 | | | | | 0 | 0 | 3 | 32 | 2 | 2 | | | | | 4 |
| 06 | 2 | 2 | | | 3 | 3 | 3 | 33 | 2 | 2 | | | | | 4 |
| 07 | 1 | 1 | 0 | 0 | 0 | 0 | | 34 | 2 | 2 | | | | | 4 |
| 08 | 3 | 3 | 0 | 0 | | | | 35 | 2 | 2 | | | 1 | 1 | 4 |
| 09 | 1 | 1 | 0 | 0 | 1 | 1 | 1 | 36 | 2 | 2 | | | 1 | 1 | 4 |
| 10 | 2 | 2 | 0 | 0 | 3 | 3 | 1 | 37 | 2 | 2 | | | 1 | 1 | 4 |
| 11 | 0 | 0 | 0 | 0 | 0 | 0 | 0 | 38 | 2 | 2 | | | 1 | 1 | 4 |
| 12 | 0 | 0 | 0 | 0 | 0 | 0 | 0 | 39 | 2 | 2 | | | 1 | 1 | 4 |
| 13 | | | | | 1 | 1 | | 40 | 2 | 2 | | | 1 | 1 | 4 |
| 14 | 1 | 1 | 1 | 1 | 0 | 0 | 0 | 41 | 2 | 2 | | | 1 | 1 | 4 |
| 15 | | | | | | | 5 | 42 | 2 | 2 | | | 1 | 1 | 4 |
| 16 | 1 | 1 | | | 0 | 0 | 0 | 43 | 2 | 2 | | | 1 | 1 | 4 |
| 17 | 0 | 0 | 1 | 1 | | | | 44 | 2 | 2 | | | | | 4 |
| 18 | 0 | 0 | 1 | 1 | | | | 45 | 2 | 2 | 0 | 0 | 1 | 1 | 2 |
| 19 | 0 | 0 | 0 | 0 | 1 | 1 | | 46 | 2 | 2 | 0 | 0 | 1 | 1 | 2 |
| 20 | 3 | 3 | | | 3 | 3 | 3 | 47 | 2 | 2 | | | 3 | 3 | 3 |
| 21 | 3 | 3 | | | 3 | 3 | 3 | 48 | 2 | 2 | | | | | 4 |
| 22 | 3 | 3 | | | 3 | 3 | 3 | 49 | 1 | 1 | 2 | 2 | | | 7 |
| 23 | | | | | 0 | 0 | 0 | 50 | 0 | 0 | 0 | 0 | | | 5 |
| 24 | 2 | 2 | | | | | 5 | 51 | 1 | 1 | 2 | 2 | | | |
| 25 | 0 | 0 | 1 | 1 | 1 | 1 | 0 | 52 | 0 | 0 | 3 | 3 | | | 7 |
| 26 | 2 | 2 | | | | | 4 | 53 | 0 | 0 | 3 | 3 | | | 7 |
| 27 | 2 | 2 | | | | | 4 | | | | | | | | |

In the TABLE the number (0, 1, 2, 3, 4, 5, 6 or 7) shown beneath each of the output signal lines of AT, AB, BT, BB, CT, CB and D designates (by input position) which of the system condition signal inputs to a multiplexor chip appears on the associated output signal line or lines. Thus, the numbers 0, 1, 2 and 3 respectively represent the first through the fourth input positions of the system condition signals applied to each half of each of the dual multiplexor chips 34, 35 and 36. Similarly, the numbers 0, 1, 2, 3, 4, 5, 6 and 7 respectively represent the first through the eighth input positions of the system condition signals applied to the multiplexor chip 37.

If no number is shown under an output signal line for a given OP code, it does not matter which input test condition signal is placed on that output signal line because in operation it will not be selected by the multiplexor 39.

To further illustrate the above, with an OP code of 49, for example, the system condition selected by the multiplexor 39 will only be one of the two second inputs to the dual multiplexor 34, one of the two third inputs to the dual multiplexor 35, or the seventh input to the multiplexor 37.

In comparing the preferred embodiment of the invention shown in FIG. 2 with the prior art shown in FIG. 1, it can be readily seen that one whole level of propagation delay time in the system condition selection path has been eliminated by the invention. Thus, in FIG. 2 the total propagation delay time in the selection path is substantially through only one level of multiplexing, namely through the multiplexor 39.

It will be recalled that the preselected seven system conditions applied to the multiplexor 39 were selected by a signal pattern from the RAM 33, which signal pattern was in turn selected as a function of the macroinstruction OP code stored in the register 31. Consequently, these preselected seven system condition signals are applied to the multiplexor 39 during the time period or duration of an entire macroinstruction. This means that, even though the microinstruction stored in the register 41 is repeatedly changed by the micro control storage (FIG. 1) during an entire macroinstruction period, substantially the only propagation delay time encountered during the selection of a different one of the preselected system conditions will be that through the multiplexor 39.

The invention thus provides in one embodiment an apparatus for reducing the propagation delay time involved in selecting a desired system condition signal from a plurality of such signals by automatically preselecting a set of system condition signals from a plurality of input system condition signals as a function of the input OP code portion of the current macroinstruction, and then selecting a desired one of the set of system condition signals as a function of each of the microinstructions selected to perform this macroinstruction.

While the salient features have been illustrated and described in a preferred embodiment of the invention, it should be readily apparent to those skilled in the art that many changes and modifications can be made without departing from the spirit and scope of the invention. It is therefore intended to cover all such changes and modifications of the invention that fall within the spirit and scope of the invention as set forth in the appended claims.

What is claimed is:

1. In a digital data processing system wherein data processing is performed by performing a plurality of macroinstructions, wherein each macroinstruction includes an operation code portion indicating the type of data processing to be performed thereby, and wherein each macroinstruction is performed by one or more microinstructions, an improved system condition signal selection means for selecting from a relatively large number of system condition signals provided by said system during operation thereof a particular system condition signal to be tested during each microinstruction, said improved system condition signal selection means comprising:

operation code storage means for storing the operation code portion of each new macroinstruction to be performed;

a memory for storing a plurality of predetermined signal patterns, each signal pattern being respectively associated with a different operation code, said memory being responsive to an operation code stored in said operation code storage means for outputting the respective signal pattern associated therewith;

first selection means operative prior to the performance of the microinstructions corresponding to said new macroinstruction, said first selection means being responsive to a signal pattern outputted from said memory for preselecting a particular relatively small plurality of system condition signals from said relatively large plurality of system condition signals and for maintaining this preselection throughout the performance of the microinstructions of the macroinstruction corresponding thereto;

microinstruction storage means for sequentially storing each microinstruction to be performed, each microinstruction including a predetermined portion for use in selecting a system condition signal to be tested during execution of the microinstruction; and second selection means operative in conjunction with the performance of each microinstruction, said second selection means being responsive to said predetermined bits of the microinstruction stored in said microinstruction storage means for selecting one of the preselected relatively small number of system condition signals for testing during performance of the microinstruction.

2. The invention in accordance with claim 1, wherein said first selection means comprises a plurality of preselection multiplexors.

3. The invention in accordance with claim 2, wherein the signals of a signal pattern outputted from said memory in response to an operation code in said operation code storage means are applied to particular ones of said preselection multiplexors in a manner such that the outputs from said preselection multiplexors represent the relatively small plurality of preselected system condition signals corresponding to the macroinstruction whose operation code is stored in said operation code storage means.

4. The invention in accordance with claim 2, wherein said second selection means comprises a multiplexor.

5. The invention in accordance with claim 3, wherein said second selection means comprises a multiplexor which is responsive to a microinstruction stored in said microinstruction storage means and also to the outputs of said preselection multiplexors for selecting one of the preselected system condition signals represented by the outputs of said preselection multiplexors for use during performance of each microinstruction.

6. The invention in accordance with claim 1, 2, 3, 4 or 5, wherein each of said operation code storage means and said microinstruction storage means is a register, wherein said memory is a random access memory, and wherein said signal patterns provided therein are chosen so that the application of an operation code to said random access memory from said microinstruction register produces a pattern of output signals from said memory which represents the particular system condition signals which might be required to be tested during performance of the microinstructions corresponding to the macroinstructions whose operation code is stored in said operation code register.

7. The invention in accordance with claim 6, including condition test logic for testing the resulting system condition selected by said second selection means.

* * * * *

UNITED STATES PATENT AND TRADEMARK OFFICE
CERTIFICATE OF CORRECTION

PATENT NO. : 4,414,625
DATED : November 8, 1983
INVENTOR(S) : Christopher F. Miller It is certified that error appears in the above-identified patent and that said Letters Patent is hereby corrected as shown below:

Col. 2, line 25, change "responsse" to --response--.
Col. 3, line 2, change "macroinstruction" to --microinstruction--.
Col. 4, line 4, change "to", first occurrence, to --in--.
Col. 6, line 63, change "macroinstructions" to --macroinstruction--.

Signed and Sealed this

Thirty-first Day of January 1984

[SEAL]

Attest:

GERALD J. MOSSINGHOFF

*Attesting Officer*  *Commissioner of Patents and Trademarks*